Figure 1:
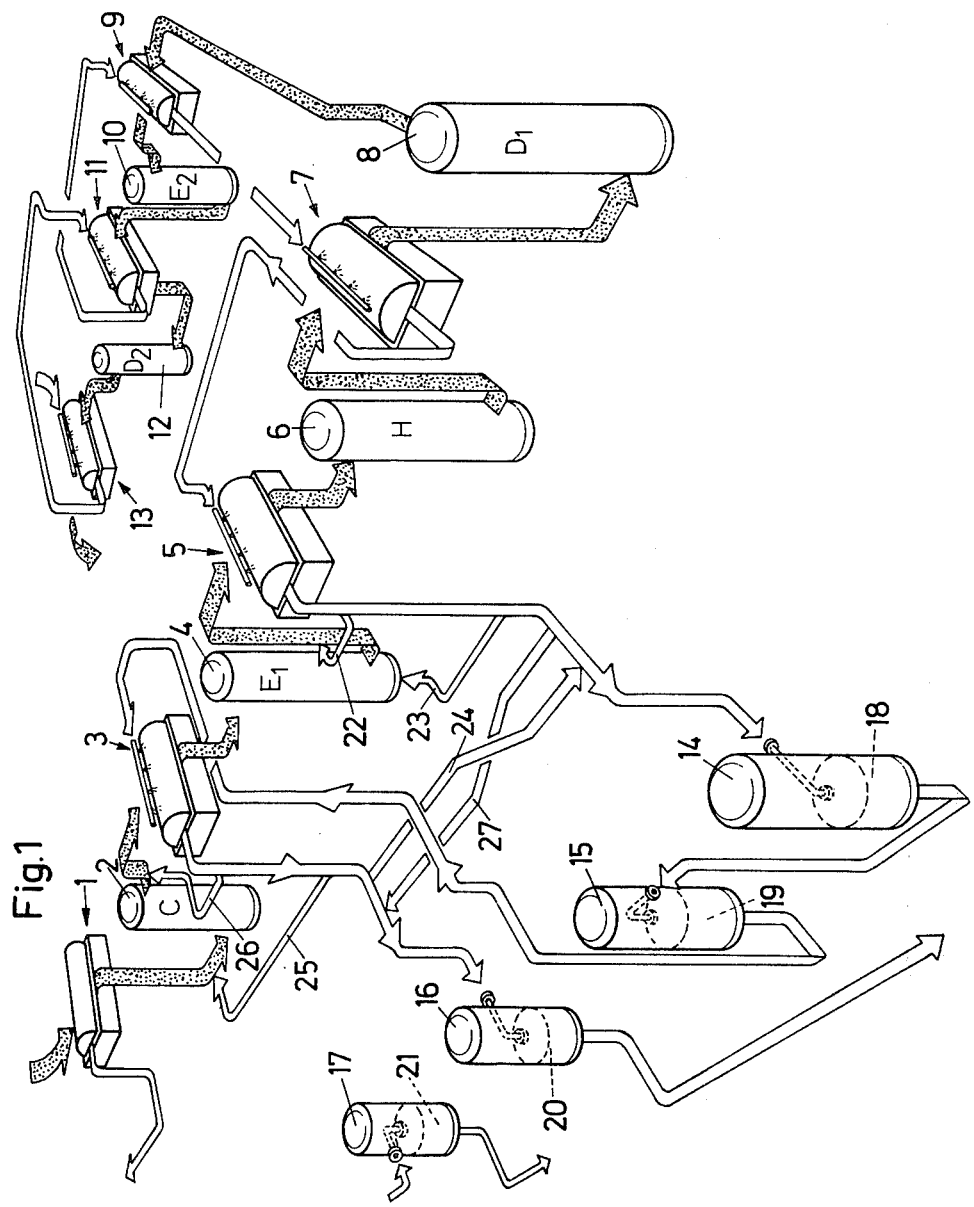

United States Patent [19] [11] 4,070,234
Anderson et al. [45] Jan. 24, 1978

[54] PROCESS RELATED TO PULP BLEACHING EFFLUENT PURIFICATION USING ION EXCHANGE RESINS

[75] Inventors: Lars-Gustaf Anderson; Hilding Roland Andersson; Bengt Gunnar Broddevall; Erik Axel Sigvard Lindberg, all of Skoghall, Sweden

[73] Assignee: Uddeholms Aktiebolag, Uddeholm, Hagfors, Sweden

[21] Appl. No.: 748,895

[22] Filed: Dec. 9, 1976

[30] Foreign Application Priority Data

Dec. 19, 1975 Sweden .............................. 75144246

[51] Int. Cl.$^2$ ............................................. D21C 11/00
[52] U.S. Cl. ....................................... 162/29; 162/60; 162/89; 142/DIG. 8; 210/37 R
[58] Field of Search ............... 162/29, 88, 89, DIG. 8, 162/60; 210/37 R

[56] References Cited

U.S. PATENT DOCUMENTS 4,000,033 12/1976 Nicolle et al. .......................... 162/29

FOREIGN PATENT DOCUMENTS 2,243,141 3/1973 Germany .............................. 210/37 R
2,501,719 7/1975 Germany .......................... 162/DIG. 8

*Primary Examiner*—Robert L. Lindsay, Jr.
*Assistant Examiner*—William F. Smith
*Attorney, Agent, or Firm*—Murray & Whisenhunt

[57] ABSTRACT

A process for purifying the effluent from a pulp bleaching process which includes a chlorine treatment, an alkali extraction, and a final bleaching is disclosed, wherein a number of washing steps are connected in counter-current series from a final wash step in the final bleach section to the wash step of the first alkali extraction stage, the strongly polluted effluent from the wash step of the first alkali extraction stage is passed through a first column containing a bed of particulate porous resin which traps and retains organic pollutants in the effluent, and a combined effluent which includes an acidic polluted liquor from the chlorine bleaching stage and a partly purified filtrate from the first column is fed through a second column which contains a bed of particulate porous resin which traps organic pollutants fed therethrough, with the resin bed in the second column being activated by the acidic nature of the combined effluent, with chloride ions in the combined effluent essentially passing through the resin bed without being trapped by the resin, so that the chloride ions are discharged with the purified filtrate from the second column. The purified filtrate is the final wash liquor effluent of the system of counter-current washing steps.

By this process the organic pollutants are efficiently separated from the wash liquors, with the chemical purification cost kept at a low level. The separated pollutants are obtained in a relatively concentrated form which facilitates evaporation and burning. The main portion of the chloride ions arising from the chlorination stage are removed with the final wash liquor effluent, which is an important advantage for further processing.

10 Claims, 5 Drawing Figures

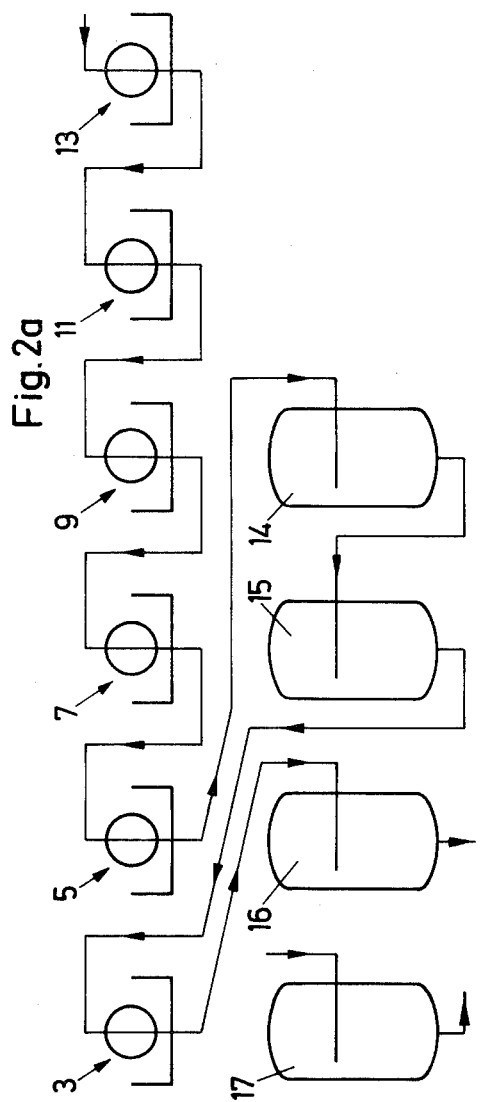

PROCESS RELATED TO PULP BLEACHING EFFLUENT PURIFICATION USING ION EXCHANGE RESINS

This invention relates to a process related to pulp bleaching having a sequence comprising treatment with chlorine, extraction with alkali, and a final bleaching section which in turn may comprise a number of various bleaching stages. More particularly the invention relates to a method of washing the bleached pulp counter-currentwise and to remove the organic pollutants from the washing liquors, particularly the coloured lignin degradation products.

It has previously been suggested completely to close the conventional chlorine based pulp bleaching by throughout connecting the washing steps counter currentwise. Following sequence has been suggested in the discussions:

|  | C-stage: | Treatment with chlorine |
|---|---|---|
|  |  | Washing |
|  | $E_1$-stage: | First alkali extraction step |
|  |  | Washing |
|  | H-stage: | Treatment with sodium hypochlorite |
|  |  | Washing |
|  | $D_1$-stage: | First treatment with chlorine dioxide |
| Final |  | Washing |
| bleaching | $E_2$-stage: | Second alkali extraction step |
| section |  | Washing |
|  | $D_2$-stage: | Second treatment with chlorine dioxide |
|  |  | Washing |

The number of stages from the H-stage to the $D_2$-stage in this specification are defined as the "final bleaching section". It is, however, within the scope of the invention to modify the final bleaching section in various ways. For example the final bleaching can be carried out according to the so-called displacement bleaching method where the initial C-stage is carried out conventionally in a separate chlorination tower, while the following stages, which may have the sequence $E_1$, $D_1$, $E_2$, $D_2$ are carried out in a joint tower in which the pulp is continuously displaced upwards.

The effluents that arise in the various stages of the chlorine based bleaching process, whether it is the question of a traditional bleaching plant or a displacement bleaching tower, have been analysed to assess the level of the various types of compound contained in them.

The pollutants contained in the effluents can be regarded as one of three types of material, dark coloured pollutants which are lignin degradation products, pollutants with increased biological oxygen demand and chlorine-containing materials which include both organochlorine compounds and ionic chlorides. It has been found that the $E_1$-stage of the chlorine based bleaching process is responsible for a majority of all of the dark coloured pollutants that arise during the pulp bleaching process. A drawback with the method which has been suggested in the past for the completely closed bleaching plant is that by feeding the wash liquors counter-currentwise through all the various washing steps there will be introduced into the wash filter of the C-stage the alkaline $E_1$-effluent which is strongly polluted with coloured lignin degradation products and other pollutats. If, in spite of this drawback, the wash liquors are throughout connected counter-currentwise so that there is obtained only one effluent, evaporation and burning of this effluent will involve large costs and technical problems due to its large volume and high contents of salts. However, by introducing into the bleaching plant a "kidney" in the form of one or more columns containing an activateable resin it will be possible to obtain an eluate having a small volume, a positive heat value, and a moderate salt content so that the eluate readily can be evaporated and burnt. It is recommended to use as a "kidney" columns containing a granulate, porous, weakly basic anion exchange resin, preferably a phenolformaldehyde resin which has shown to have the best ability to trap coloured lignin degradation products and also to have a good ability to trap oxygen consuming degradation products of cellulose and hemicellulose.

It is previously known through the Swedish patent specification 356,085 to separate organic pollutats from alkaline extraction stages in pulp bleaching plants by treating the effluent with a weakly basic anion exchange resin, more particularly with a weakly basic phenolformaldehyde anion exchange resin. Through the Swedish patent specification 381,481 it is further known a method to take care of chlorolignin containing eluates, which suggests the use of acidic chloride containing solutions as activation agents for the ion exchanger. Further it is known through the Swedish patent specification 370,425 to release chloride ions from the resin bed by washing the bed with a salt solution. Herethrough it is also possible to reduce the risk for corrosion in the evaporation and recovery plants.

It is also known through the U.S. Pat. No. 3,652,407 to separate coloured organic lignin degradation products from bleaching plant effluents through the treatment with adsorbent resins. According to this prior method the alkaline (pH 9-10) extraction stage effluent is first treated with lime to obtain a precipitate whereupon the precipitate is removed by filtration. Thereafter the filtrate is combined with the acidic (pH 2) effluent from the chlorination stage. The combined effluent which has obtained a pH approx. 2-4 thereafter is treated with the said adsorbent resin.

The method according to the invention is an improvement and development of previous art and is characterized in a. that at least a number of washing steps are connected in series counter-currentwise from a washing step in the final bleaching section to the wash step of the first alkali extraction stage;

b. that a strongly polluted effluent from the wash step of said first alkali extraction stage is fed through a first column containing a bed of a particulate, porous resin provided to trap (take up) and retain organic pollutants in the effluent, and;

c. that a combined effluent comprising on one hand an acidic, polluted liquor from said chlorine bleaching stage and, on the other hand the partly purified filtrate from said first column is fed through a second column which also contains a bed of a particulate, porous resin provided to trap organic pollutants from the chlorine bleaching stage and residual organic pollutants in the filtrate from the first column existing in the combined effluent, at the same time as the resin bed in said second column is being activated by the acidic combined effluent, and chloride ions in the combined effluent essentially are passing the resin bed without being trapped by the resin so that said chloride ions are discharged together with the purified filtrate from said second column, said purified filtrate being the final wash liquor effluent of said system of counter-currentwise arranged washing steps.

For the first this process offers a possiblity to close the bleaching plant so that the need of fresh water can be minimized. Further the organic pollutants are efficiently separated from the wash liquors. It is also possible to keep the chemical costs for the purification at a low level by using the filtrate from the C-stage wash liquor as an activation agent, and an developed embodiment of the process of the invention is characterized in that said wash liquor is used for this purpose. It is also an important advantage that the separated pollutants are obtained in a concentrated form as an eluate with a positive heat value which facilitates evaporation and burning. A very important effect also is that the main portion of the chloride ions from the chlorination stage are removed together with the final wash liquor effluent.

Further characteristic features and advantages of the invention will be apparent from the following description of a preferred embodiment with reference to the accompanying drawings, in which FIG. 1 shows a flow scheme for a bleaching plant operatng according to an embodiment of the process according to the invention, while 2a, 2b, 2c, 2d illustrate how resin columns and washing steps are coupled during four different phases at the performance of the process.

FIG. 1 shows, diagramatically, a bleaching plant with associated effluent purification means. The plant comprises generally decanter 1, for receiving pulp from a screening plant, chlorination tower 2 (C-step), first alkaline treating tower 4 ($E_1$-step), sodium hypochloride treating tower 6 (H-step), first chlorine dioxide bleaching tower 8 ($D_1$-step), second alkaline treating tower 10 ($E_2$-step) and second chlorine dioxide bleach tower 12 ($D_2$-step)). Wash filters 3, 5, 7, 9, 11 and 13 are provided respectively after each of the C, $E_1$, H, $D_1$, $E_2$ and $D_2$ bleaching steps and conduits (indicated by dotted arrows) are provided for the passage of pulp into and from decanter 1, through the C-stage bleaching tower, C-stage wash filter, $E_1$-stage bleaching tower, $E_1$-stage wash filter, H-stage bleaching tower, H-stage wash filter, $D_1$-stage bleaching tower, $D_1$-stage wash filter, $E_2$-stage bleaching tower, $E_2$-stage was filter, $D_2$-stage bleaching tower, and $D_2$-stage wash filter. Fresh water is supplied to the $D_2$-stage wash filter 13.

Conduits (empty arrows) are provided for the passage of used wash water from the $D_2$-stage wash filter 13 to the $E_2$-stage wash filter 11, from the $E_2$-stage wash filter 11 to the $D_1$-stage wash filter 9, therefrom to the H-stage wash filter 7 and then to the $E_1$-stage wash filter 5.

The bleaching plant also comprises four columns 14, 15, 16 and 17. Each these columns, according to the illustrated embodiment of the process of the invention, contains a bed of a weakly basic anion exchange resin, more particularly a weakly basic, granulate, porous phenol formaldehyde resin. The resin beds have been designated 18, 19, 20 and 21 respectively. Two of the columns — during the phase of the process illustrated in FIG. 1, columns 14 and 15 — are connected in series between the $E_1$-stage wash filter 5 and the C-stage wash filter 3. For this purpose conduits are provided to supply used wash liquor from E-stage wash filter 5 to column 14, therefrom to column 15 and from column 15 to supply the filtrate to the C-stage wash filter 3. Further there is provided a conduit to supply the used C-stage wash filter effluent to column 16. It is also possible to replace the various columns with one single column comprising a number of floors or sections, each section corresponding a column according to the plant illustrated in he drawing.

A conduit 22 is provided to transfer part of the $E_1$-stage wash effluent to dilute the pulp which is transported from the $E_1$-stage bleaching tower 4 to $E_1$-stage wash filter 5. A conduit 23 is provided also to transfer part of the $E_1$-stage wash liquor into the $E_1$-stage bleaching tower 4. In an analogous way conduits 26 and 25 are provided to supply used C-stage wash liquor to the pulp from and to the C-stage bleaching tower 2, respectively. Further there is provided a conduit 27 to transfer used $E_1$-stage wash liquor into the conduit provided for the supply of C-stage wash liquor from filter 3 to column 16 and a conduit 24 to transfer used C-stage wash liquor in the opposite direction. As is illustrated in FIG. 1 the introduction of the liquors in the C-stage wash liquor and in the $E_1$-stage wash liquor respectively are made downstream relative to the tapping points.

The flow scheme of FIG. 1 illustrates one phase of the preferred embodiment of the process according to the invention.

This phase now will be explained more in detail.

The filtrate which is obtained in the form of used wash liquor from the $E_1$-stage wash filter 5 contains the combined quantity of dissolved pollutants from the $E_1$-stage and the whole of the final bleaching section. Particularly the contribution of pollutants in the form of coloured organic lignin degradation products and oxygen consuming degradation products of cellulose and hemicellulose from the $E_1$-stage is considerable. The main portion of this filtrate is supplied to column 14. Minor portions in a manner known per se also can be fed back to dilute the pulp from the $E_1$-stage bleaching tower via the conduit 22 or to be supplied to the $E_1$-stage bleaching tower 4 via the conduit 23.

According to the embodiment of the process the resin beds 18 and 19 during previous phases have been activated by means of the used acidic washing liquor from the C-stage wash filter 3. The activated resin beds 18 and 19 in columns 14 and 15 trap (take up) and retain the pollutants in the used wash liquor supplied from the $E_1$-stage wash filter 5. By connecting the columns 14 and 15 in series as is shown in FIG. 1 there is on one hand obtained a high degree of purification with reference to coloured substances and other pollutants and on the other hand created a greater safety against break through which may occur due to the formation of channels in the resin beds 18 and 19.

The purified wash liquor from column 15 is supplied to the C-stage wash filter 3 and is used as wash liquor in this filter. The acidic effluent from filter 3 is supplied to column 16 so that the resin bed 20 in column 16 is activated. The filtrate from column 16, which filtrate contains the main portion of the chlorides from the C-stage, finally is discharged or is transferred for further purification by biological or other treatment. It is also possible to supply this effluent to some unit in the pulp or paper plant where high concentrations of chlorides can be tolerated. When the liquid is passed through the resin bed 20 in column 16 also foam forming substances very efficiently are removed which also is an important feature of the process of the invention as the purified effluent therethrough readily can be taken care of.

By the activation by means of the acidic washing liquor from the C-stage wash filter 3 the liquid phase of the resin bed 20 obtains a pH of about 2. The effluent from the $E_1$-stage wash filter 5 normally has a fluctuating, comparatively high pH. Usually pH in the extraction filtrate is between 10 and 12 but also lower and in exceptional cases higher pH values can occur. From natural reasons this pH fluctuation will make it more difficult to obtain optimal conditions in the resin beds 18 and 19. Therefore it would be more advantageous to keep the pH level of incoming liquor constant at entrance to column 14. According to a developed embodiment of the invention this advantageously can be performed by adjusting pH in the incoming liquid from the $E_1$-stage wash filter 5 to column 14 by transfer of a portion of the acidic used washing liquor from the C-stage wash filter 3 through conduit 24. Another fraction of the acidic wash liquor from filter 3 in a manner known per se can be recycled via the conduit 25 to the C-stage chlorination tower 2 or be directly recycled to the filter 3 via the conduit 26. The main portion of the acidic wash liquor from the filter 3, however, is supplied to column 16 wherefrom a highly purified filtrate is obtained. A very efficient separation of foam forming substances is obtained at the same time as the resin is efficiently activated.

The effluent from the wash filter 3 after the chlorine treatment normally contains a small amount of free chlorine. This chlorine suitably is eliminated before the wash liquor is supplied to the resin bed 20 in the column 16 in turn to be activated, as free chlorine can damage the resin. This elimination can be carried out by transferring via conduit 27 a small amount of wash liquor from the $E_1$-stage wash filter so that the organic substance in this liquor will react with the free chlorine. As an alternative this elimination also can be carried out by the introduction of a small amount of "$SO_2$-water" into the C-stage wash effluent prior to entry into column 16.

At the same time as the filtrate from the $E_1$-stage wash filter is purified in columns 14 and 15, and the resin 20 is activated in column 16 by means of the filtrate from the C-stage wash filter 3, the resin bed 21 in column 17 is eluted. This resin during a previous phase has been saturated with pollutants from the $E_1$-stage wash filter. As an eluting agent there is used an alkaline solution, such as sodium hydroxide solution or ammonia.

Advantageously one can also use caustic liquors from the pulp mill as for example oxidized white liquor.

Figure 2B:
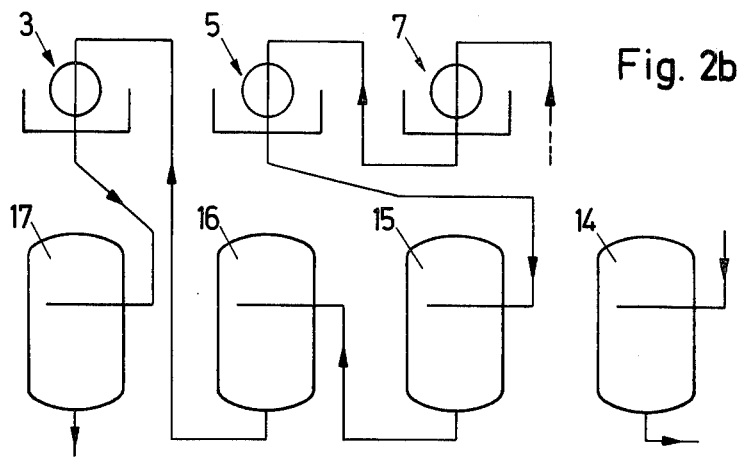
Figure 2C:
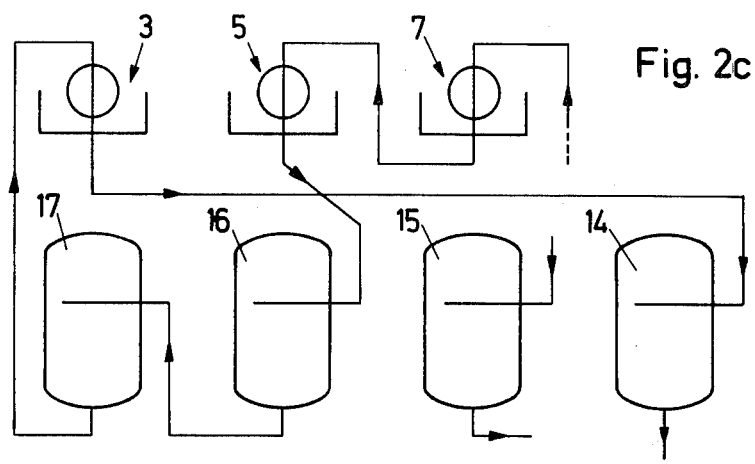
Figure 2D:
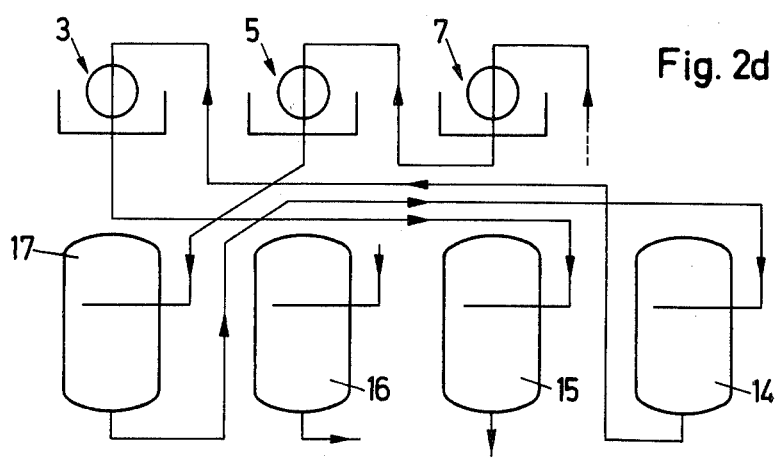

When the resin bed 18 in column 14 has been saturated with pollutants from the $E_1$-filter 5 the columns are thrown over, FIG. 2b. In the next phase the polluted wash liquor from the filter 5 is supplied directly to column 15, whereupon the filtrate from column 15 is supplied to column 16 containing the resin bed 20 which was activated in the previous phase. The acidic wash liquor from the chlorine treatment stage filter 3 is supplied to the eluted column 17, while the polluted resin bed 18 in column 14 is eluted by means of an alkaline solution. The colour of discharged filtrate from the first of the two columns which are connected in series and which receive the polluted filtrate from the $E_1$-filter 5 is a measure of the degree of saturation of the resin as far as pollutants is concerned. A suitable point to stop the treatment and to throw over the columns in the manner above described is when the filtrate coming out from the first of the two columns is no longer purified to a degree corresponding to a desired over all colour removal, suitably an over all colour removal between 85 and 95%. FIG. 2c and 2d illustrate the last two of the four phases of the process according to the embodiment of the invention.

Variations of the process described with reference to FIG. 1 and 2, of course, are conceivable without exceeding the spirit and scope of the invention. Thus it is very well possible that the counter-currentwise connected washing steps do not comprise all washing steps in the final bleaching section. For example it is possible in a manner per se to connect the alkaline washing steps and the acidic washing steps counter-currentwise separately. The combined alkaline wash liquor then in the manner described suitably is supplied to an activated resin bed, while the acidic effluents are combined in the wash filter filtrate of the chlorination stage and is used for activation purposes. Also other modifications of course are conceivable, such as for example not to include all washing steps in the counter currentwise coupling prior to the $E_1$-stage wash filter. It should also be mentioned that the two columns 14 and 15 are connected in series in order to create an extra safety but that it is principally possible to eliminate one of these columns if the demands upon safety against break through due to channel formation is lower. The method according to the invention also can be used in the case of other bleaching sequences then the one which has been described in the specification.

EXAMPLE

A laboratory column contained about 55 ml of a weakly anion active phenol formaldehyde resin. The resin was newly eluted when effluent water from the initial chlorination stage wash filter in a kraft paper pulp mill bleaching plant was fed into the resin bed at a rate of 17 bed volumes per hour. The incoming liquor had a pH = 1,92 and its contamination with colour corresponded to 15,4 g Pt-units per liter liquor. Its content of chemically oxygen consuming substance (COD-contents) corresponded to 14,8 g $KMnO_4$ consuming substance per liter liquor, pH in outcoming filtrate successively dropped from initially pH = 12,08 to pH = 1,80 when 55 bed volumes had passed the bed. The difference of final pH as compared to incoming liquor is due to inaccuraceness in the measurement equipment. The development of pH value in outcoming filtrate is given in the following table:

| Bed volume No. | pH |
| --- | --- |
| 1 | 12,08 |
| 10 | 10,90 |
| 20 | 9,02 |
| 30 | 9,00 |
| 40 | 8,82 |
| 45 | 8,22 |
| 50 | 4,82 |
| 55 | 1,80 |

In the last bed volume obtained from the column there were 2,9 g Pt-units and 4,6 g $KMnO_4$ consuming substance per liter liquor. The foam forming tendency, which was very great in the incoming solution, had practically been eliminated.

In the same column there was thereafter without any supply of additional acidic solution supplied 25 bed volumes from the $E_1$-stage wash filter in the same bleaching plant. Incoming pH was about 9,8 while pH of the filtrate during the whole of this phase was about 2,7. Incoming colour corresponded to 96,9 Pt-units while the average colour content in outcoming filtrate corresponded to about 9,5 g Pt-units per liter liquor. Corresponding figures for $KMnO_4$ consuming substance was 41,1 g and 6,3 g per liter liquor respectively. The purification efficiency of the resin as far as colour was concerned thus was about 90% when the experiment was stopped after 25 bed volumes. Thereafter the resin was eluted by means of oxidized white liquor.

We claim:

1. In a pulp bleaching process comprising sequentially subjecting the pulp to treatment with chlorine, extraction with alkali, and bleaching in a plurality of bleach stages, the improvement comprising
   a. washing the pulp in a plurality of counter-current wash steps connected in series from a final bleach section wash step to a first alkali extraction stage wash to produce a strongly polluted effluent from the first alkali extraction stage wash step;
   b. feeding said strongly polluted effluent through a first bed of activated particulate porous weakly basic anion exchange resin to retain organic pollutants in said effluent in said first bed; and
   c. using the effluent from said first bed to wash pulp leaving the chlorine treatment stage, to produce an acidic chlorine treatment stage wash effluent; and passing said chlorine treatment stage wash effluent through a second bed of particulate porous weakly basic anion exchange resin to retain any organic pollutants from said chlorine bleaching stage and residual organic pollutants in the effluent from said first bed in said second bed, while activating the second resin bed, and while passing chloride ions in said chloride treatment stage wash effluent through said second bed without retaining same to discharge said chloride ions from said pulp bleaching process in a purified effluent from said second bed as the final wash liquor effluent of said plurality of counter-current wash steps.

2. Process of claim 1, wherein said first resin bed was activated in a previous phase of operation by said acidic chlorine treatment stage wash effluent.

3. Process of claim 1, including further step of eluting a third resin bed by means of an alkaline solution so that organic pollutants retained on said third resin bed during a previous phase of operation are removed therefrom in the form of a concentrated eluate.

4. Process of claim 3, wherein when said first resin has been saturated to a given degree with pollutants, said resin bed is eluted by means of an alkaline solution to produce an eluate of concentrated pollutants, said strongly polluted effluent is supplied to said second resin bed which has been activated by means of said acidic chlorine treatment stage wash effluent, and said acidic chlorine treatment stage wash effluent is introduced into the eluted third resin bed to activate same.

5. Process of claim 1, wherein all non-acidic filtrates from wash filters are combined to form a said first alkali extraction stage wash filtrate by connecting said wash filters in counter-current series.

6. Process according to claim 1, wherein all wash steps from the last wash step of the final bleach section to the first alkali extraction are counter-currently connected in series.

7. Process of claim 6, wherein the sole discharge effluent from the pulp bleaching process is the filtrate from the second resin bed.

8. Process of claim 1, wherein the pH value of the said strongly polluted effluent from said first alkali extraction stage wash step is maintained substantially constant as supplied to said first resin bed by admixing therewith an acidic wash liquor from at least one bleach plant wash filter.

9. Method of claim 8, wherein said acidic wash liquor is a fraction of the said acidic chlorine treatment stage wash effluent.

10. Process of claim 1, wherein free chlorine in said acidic chlorine treatment stage wash effluent is eliminated by admixing with said acidic chlorine treatment stage wash effluent a fraction of the first alkali extraction stage wash step effluent before said acidic chlorine treatment stage wash effluent is introduced into said second resin bed.

* * * * *